United States Patent
Huang et al.

(10) Patent No.: US 12,422,262 B2
(45) Date of Patent: Sep. 23, 2025

(54) NAVIGATION PATH PLANNING METHOD AND APPARATUS, DEVICE, AND STORAGE MEDIUM

(71) Applicant: BEIJING BAIDU NETCOM SCIENCE TECHNOLOGY CO., LTD., Beijing (CN)

(72) Inventors: Jizhou Huang, Beijing (CN); Kejiao Li, Beijing (CN); Bo Zhou, Beijing (CN); Fan Wang, Beijing (CN); Jingzhou He, Beijing (CN); Haifeng Wang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 420 days.

(21) Appl. No.: 17/999,917

(22) PCT Filed: Apr. 28, 2022

(86) PCT No.: PCT/CN2022/089784
§ 371 (c)(1),
(2) Date: Nov. 25, 2022

(87) PCT Pub. No.: WO2023/029534
PCT Pub. Date: Mar. 9, 2023

(65) Prior Publication Data
US 2023/0243661 A1    Aug. 3, 2023

(30) Foreign Application Priority Data
Aug. 31, 2021 (CN) .......................... 202111015963.5

(51) Int. Cl.
*G01C 21/34* (2006.01)
*G08G 1/01* (2006.01)

(52) U.S. Cl.
CPC ..... *G01C 21/3461* (2013.01); *G01C 21/3492* (2013.01); *G08G 1/0108* (2013.01)

(58) Field of Classification Search
None
See application file for complete search history.

(56) References Cited

U.S. PATENT DOCUMENTS

2008/0004789 A1*  1/2008  Horvitz .............. G08G 1/0104
                                                                340/936
2017/0075358 A1*  3/2017  Zhang ................. G05D 1/0287
(Continued)

FOREIGN PATENT DOCUMENTS

CN    104881992 A  *  9/2015
CN    107421556 A      12/2017
(Continued)

OTHER PUBLICATIONS

English translation of CN-110533932-A, retrieved from Espacenet on Mar. 17, 2025 (Year: 2025).*
(Continued)

Primary Examiner — Amelia Vorce
(74) Attorney, Agent, or Firm — Hunton Andrews Kurth LLP

(57) ABSTRACT

A navigation path planning method includes planning at least two available navigation paths for each target user of at least two target users in a target region by using a path planning algorithm; and determining a global passing feature of the target region and selecting, according to the global passing feature of the target region, one available navigation path from the at least two available navigation paths corresponding to each target user to serve as a recommended navigation path to be recommended to each target user, where the global passing feature of the target region refers to a global passing feature of the at least two target users in the target region and is used for cooperative (Continued)

path planning that takes into account a global passing time length in the target region.

13 Claims, 10 Drawing Sheets

(56) References Cited

U.S. PATENT DOCUMENTS

| | | | |
|---|---|---|---|
| 2017/0372608 A1 | 12/2017 | Sugimoto et al. | |
| 2018/0195876 A1* | 7/2018 | Akiyama | G01C 21/3694 |
| 2019/0114595 A1* | 4/2019 | Raghunathan | G01C 21/3423 |
| 2019/0120638 A1* | 4/2019 | Min | G01C 21/3415 |
| 2020/0082716 A1 | 3/2020 | Britt et al. | |
| 2020/0300649 A1* | 9/2020 | Kim | G08G 1/096811 |
| 2021/0150429 A1* | 5/2021 | Atanasiu | G01C 21/3438 |
| 2021/0356284 A1* | 11/2021 | Cella | G06V 10/764 |
| 2022/0349722 A1* | 11/2022 | Con | G01C 21/3469 |

FOREIGN PATENT DOCUMENTS

| | | | |
|---|---|---|---|
| CN | 108280181 A | | 7/2018 |
| CN | 108847037 A | | 11/2018 |
| CN | 110398254 A | | 11/2019 |
| CN | 110533932 A | * | 12/2019 |
| CN | 110702129 A | | 1/2020 |
| CN | 111307169 A | | 6/2020 |
| CN | 111982138 A | | 11/2020 |
| CN | 112414420 A | | 2/2021 |
| CN | 113029183 A | | 6/2021 |
| CN | 113758494 A | | 12/2021 |
| IN | 110310480 A | | 10/2019 |
| JP | H11203594 A | | 7/1999 |
| JP | 2001167386 A | | 6/2001 |
| JP | 2002063680 A | | 2/2002 |
| JP | 2007033057 A | | 2/2007 |
| JP | 2013057544 A | | 3/2013 |
| JP | 2016130897 A | | 7/2016 |
| JP | 2016535277 A | | 11/2016 |
| JP | 2020160960 A | | 10/2020 |
| WO | WO-2020101474 A1 | * | 5/2020 |

OTHER PUBLICATIONS

International Search Report, International Search Authority, issued to Application No. PCT/CN2022/089784, mailed on Aug. 1, 2022, 10 pages.
Chapter 15 Markov Decision Process, Part 5 Traffic Light Dispatching, 5 pages.
The National Intellectual Property Administration, CN Supplemental Search Report issued in CN application No. 2021110159635 on Dec. 14, 2022, 4 pages.
The National Intellectual Property Administration, Notice of the Second Review Opinion issued to CN application No. 202111015963.5 on Dec. 20, 2022, 18 pages.
Notice of Reasons for Refusal issued in corresponding JP Application No. 2022-566307, dated Oct. 19, 2023, 8 pages.

* cited by examiner

NAVIGATION PATH PLANNING METHOD AND APPARATUS, DEVICE, AND STORAGE MEDIUM

CROSS-REFERENCES TO RELATED APPLICATIONS

This application is a national stage application filed under 35 U.S.C. § 371 based on International Patent Application No. PCT/CN2022/089784, filed on Apr. 28, 2022, which claims priority to Chinese Patent Application No. 202111015963.5 filed with the China National Intellectual Property Administration (CNIPA) on Aug. 31, 2021, the disclosures of which are incorporated herein by reference in their entireties.

TECHNICAL FIELD

The present disclosure relates to the field of computer technology and, in particular, to the field of artificial intelligence technology including intelligent transportation, electronic map, and reinforcement learning, for example, a navigation path planning method and apparatus, an electronic device, and a computer-readable storage medium.

BACKGROUND

Traffic jams are a growing problem in the development of cities. Economic losses due to traffic jams account for about 5% of gross domestic product (GDP) each year. Therefore, an improvement in the traffic efficiency can bring about great social interest.

As one of the auxiliary tools frequently used outdoors, a navigation product can plan a path for a user according to departure and destination points of the user when the user is outdoors, especially in an unfamiliar environment.

SUMMARY

The present disclosure provides a navigation path planning method and apparatus, a device, and a storage medium to improve the travel efficiency in a target region.

According to one aspect of the present disclosure, a navigation path planning method is provided.

The navigation path planning method includes planning at least two available navigation paths for each target user of at least two target users in a target region; and determining a global passing feature of the target region and selecting, according to the global passing feature of the target region, one available navigation path from the at least two available navigation paths corresponding to each target user to serve as a recommended navigation path to be recommended to each target user.

According to another aspect of the present disclosure, a navigation path planning apparatus is provided. The navigation path planning apparatus includes an available path planning module and a recommended path selection module.

The available path planning module is configured to plan at least two available navigation paths for each target user of at least two target users in a target region.

The recommended path selection module is configured to determine a global passing feature of the target region and select, according to the global passing feature of the target region, one available navigation path from the at least two available navigation paths corresponding to each target user to serve as a recommended navigation path to be recommended to each target user.

According to another aspect of the present disclosure, an electronic device is provided. The electronic device includes at least one processor and a memory communicatively connected to the at least one processor.

The memory stores instructions executable by the at least one processor to enable the at least one processor to perform the navigation path planning method.

According to another aspect of the present disclosure, a non-transitory computer-readable storage medium is provided. The storage medium stores computer instructions for causing a computer to perform the navigation path planning method.

According to another aspect of the present disclosure, a computer program product is provided. The computer program product includes a computer program/instructions which, when executed by a processor, cause the processor to perform the navigation path planning method.

DETAILED DESCRIPTION

Example embodiments of the present disclosure, including details of the embodiments of the present disclosure, are described hereinafter in conjunction with the drawings to facilitate understanding. The example embodiments are for illustrative purposes only. A description of well-known functions and structures and a description of functions and structures with low relevance to the embodiments below are omitted hereinafter for clarity and conciseness.

Solutions according to embodiments of the present disclosure are described hereinafter in conjunction with the drawings.

Figure 1A:
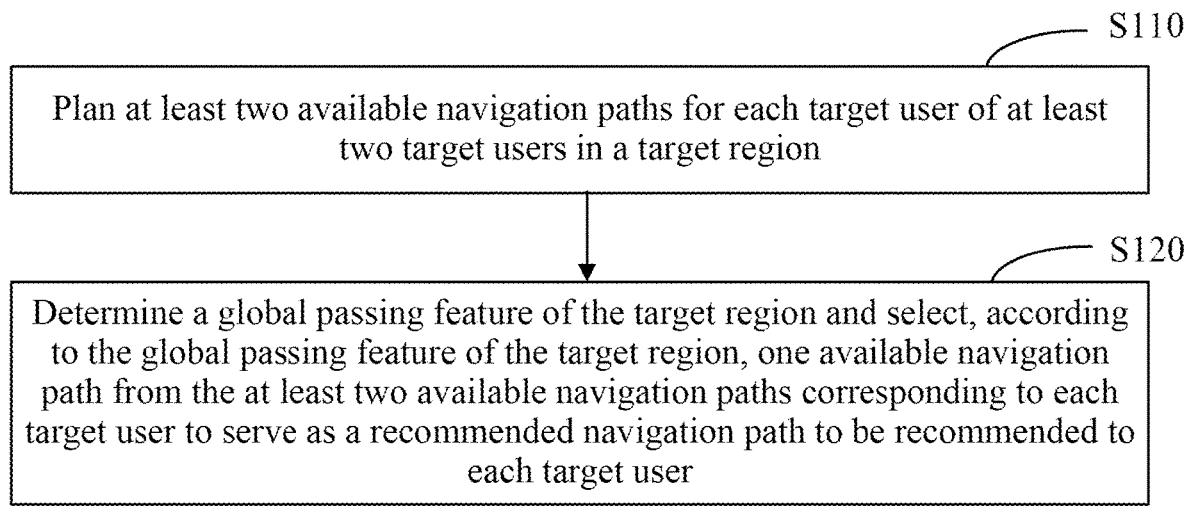
FIG. 1A is a flowchart of a navigation path planning method according to an embodiment of the present disclosure.

FIG. 1A is a flowchart of a navigation path planning method according to an embodiment of the present disclosure. This embodiment is applicable to the case where a recommended path is provided for a user based on an electronic map. The method may be performed by a navigation path planning apparatus. The apparatus may be implemented as hardware and/or software. The apparatus may be configured in an electronic device. Referring to FIG. 1A, the method includes the steps below.

In S110, at least two available navigation paths are planned for each target user of at least two target users in a target region.

In S120, a global passing feature of the target region is determined, and one available navigation path is selected according to the global passing feature of the target region from the at least two available navigation paths corresponding to each target user to serve as a recommended navigation path to be recommended to each target user.

In this embodiment of the present disclosure, region division may be performed based on road network topology information so that multiple regions are obtained. The road network topology information may be constructed by using, for example, the adjacency matrix method or the graph neural network method. This is not limited in this embodiment of the present disclosure. Each target user is a user having a requirement for navigation. A region including at least two target users is used as the target region.

At least two available navigation paths from the start point to the end point in the target region are planned for each target user in the target region according to the start point information and the end point information of each target user by using a path planning algorithm. The path planning algorithm may be, for example, the Dijkstra algorithm, the A* heuristic search algorithm, the D* reverse incremental search algorithm, the Lifelong Planning A* (LPA*) algorithm, or the model algorithm. Different target users may correspond to different vehicles. Multi-user navigation path planning is multi-vehicle navigation path planning.

The global passing feature of the target region refers to the global passing feature of multiple target users in the target region, not the local passing feature of a single target user in the target region. The global passing feature of the target region is used for cooperative path planning that takes into account the global passing time length in the target region.

Figure 1B:
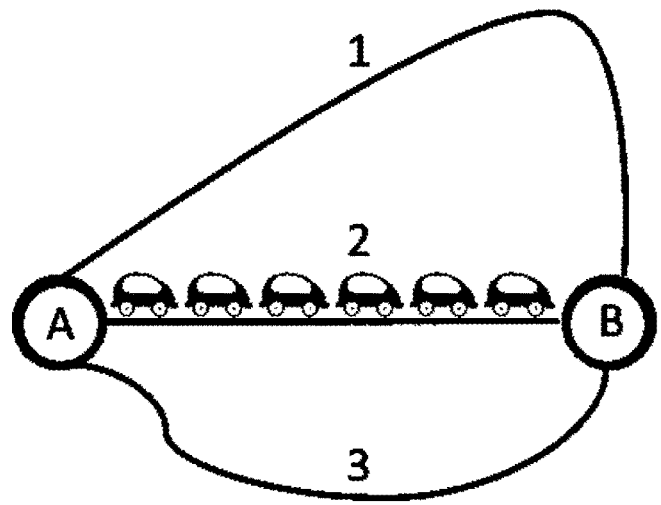
FIG. 1B is a diagram of a navigation path planning effect in the related art.

In the related art, path planning is performed according to the passing time length of a single target user, regardless of the influence of other users in the target region. For example, the passing time length of each available navigation path of a target user is determined for the target user, and the available navigation path requiring the shortest passing time length is used as the recommended navigation path of the target user. For example, in the target region, the start point of each of the six target users is point A, the end point of each of the six target users is point B, and the available navigation paths include path 1, path 2, and path 3, where the passing time length of path 2, the passing time length of path 3, and the passing time length of path 1 increase progressively. Referring to FIG. 1B, in the related art, path 2 requiring the shortest passing time length is as a recommended navigation path recommended to each target user, causing congestion in path 2 due to overload, lowering the passing efficiency of each user in path 2, and thereby increasing the passing time length of each user in path 2.

Figure 1C:
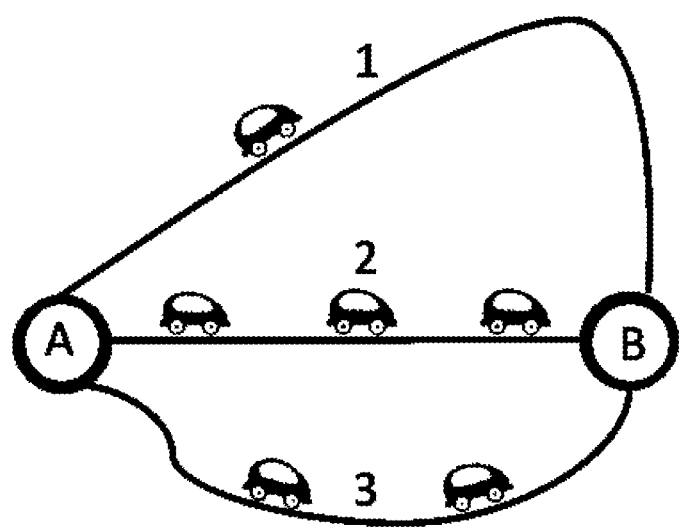
FIG. 1C is a diagram of a navigation path planning effect according to an embodiment of the present disclosure.

However, in this embodiment of the present disclosure, the global passing feature of the target region is determined, and a recommended navigation path is determined with the goal of optimizing the global passing time length of multiple users in the target region, that is, navigation path planning is performed with the general interest of the target region as the goal. Here the preceding requirement for travelling is used as an example again. Referring to FIG. 1C, to reduce the global passing time length of the six users, it is feasible to allocate some users to path 1 or path 3. For example, path 2 is recommended as a recommended navigation path to three users in the target region, path 3 is recommended as a recommended navigation path to two users, and path 1 is recommended as a recommended navigation path to one user. Navigation path planning based on the general interest enables the reasonable dynamic management of the overall traffic resources so that the traffic network load is more even, and traffic congestion is relieved. Thereby, the average passing time length of the multiple target users is reduced, and the average travel efficiency in the target region is improved.

According to the solution of this embodiment, by taking into account the overall passing time length in the target region and based on the navigation planning scheme based on the general interest, a reasonable recommended path for each user in the target region with a higher global commuting efficiency is provided, thereby improving the overall commuting efficiency and travel efficiency in the target region.

Figure 2:
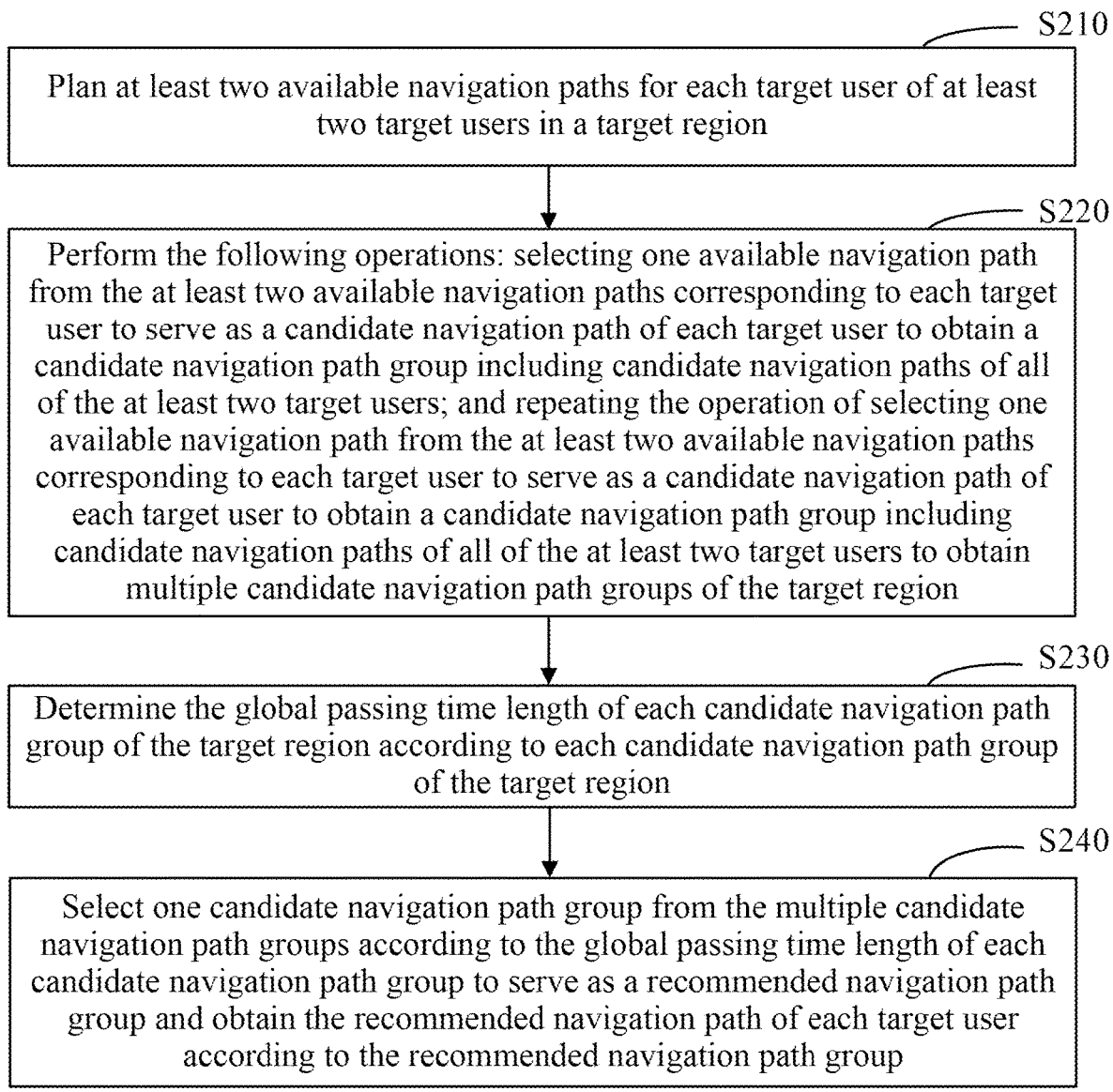
FIG. 2 is a flowchart of another navigation path planning method according to an embodiment of the present disclosure.

FIG. 2 is a flowchart of another navigation path planning method according to an embodiment of the present disclosure. This embodiment is an optional solution provided based on the preceding embodiment. Referring to FIG. 2, the navigation path planning method according to this embodiment includes the steps below.

In S210, at least two available navigation paths are planned for each target user of at least two target users in a target region.

In S220, the following operations are performed: selecting one available navigation path from the at least two available navigation paths corresponding to each target user to serve as a candidate navigation path of each target user to obtain a candidate navigation path group including candidate navigation paths of all of the at least two target users; and repeating the operation of selecting one available navigation path from the at least two available navigation paths corresponding to each target user to serve as a candidate navigation path of each target user to obtain a candidate navigation path group including candidate navigation paths of all of the at least two target users to obtain multiple candidate navigation path groups of the target region.

In S230, the global passing time length of each candidate navigation path group of the target region is determined according to each candidate navigation path group of the target region.

In S240, one candidate navigation path group is selected from the multiple candidate navigation path groups according to the global passing time length of each candidate navigation path group to serve as a recommended navigation path group, and the recommended navigation path of each target user is obtained according to the recommended navigation path group.

One candidate navigation path group includes a candidate navigation path selected for each target user. The number of candidate navigation paths in the candidate navigation path group is the same as the number of target users. For example, with regard to each target user in the target region, at least two available navigation paths may be planned for each target user; one available navigation path is selected for each target user from the at least two available navigation paths of each target user to serve as a candidate navigation path so that a candidate navigation path group including candidate navigation paths of all the target users is obtained. The number of candidate navigation path groups is not limited in this embodiment of the present disclosure. For example, there are three target users in the target region, and each target user has three available navigation paths, and the maximum number of candidate navigation path groups is 27.

The global passing time length of a candidate navigation path group may be determined in the following manner: With regard to each candidate navigation path in the candidate navigation path group, the passing time length of the each candidate navigation path is calculated according to the length of each road segment in the each candidate navigation path and the target passing speed of the road segment in the target time window; the sum of the passing time lengths of the multiple candidate navigation paths in the candidate navigation path group is calculated so that the global passing time length of the candidate navigation path group is obtained. The global passing time length of the candidate navigation path group is used as the global passing feature of the target region. The target time window may be located after the current time window, for example, may be the next time window. The length of a single time window is not limited, for example, may be 30 minutes or 1 hour. The target time window may be construed as one time period in the passing process during which all users are assumed to pass through one path or road segment. The current time window may be construed as the current time period during which one or more users pass through a road segment in the actual situation. The current passing speed of the road segment corresponding to the current time window may be the actually monitored road segment passing speed.

One candidate navigation path group may be selected from multiple candidate navigation path groups according to the global passing time length of each candidate navigation path group to serve as a recommended navigation path group. For example, the candidate navigation path group requiring the shortest global passing time length may be used as the recommended navigation path group, and the candidate navigation path of each target user in the recommended navigation path group may be used as the recommended navigation path of each target user. A multi-user navigation path may be planned based on the general interest by using the central control algorithm. The global passing time length of each candidate navigation path group is determined according to the global road condition feature in the target region and with the overall traffic passing time length in the target region as the goal. One candidate navigation path group is selected from multiple candidate navigation path groups according to the global passing time length to serve as a recommended navigation path group so that the recommended navigation path of each target user is obtained. In this manner, global optimization of the target region is achieved, and the overall passing efficiency is improved.

In an optional embodiment, selecting the one available navigation path from the at least two available navigation paths corresponding to each target user to serve as the candidate navigation path of each target user to obtain the candidate navigation path group including the candidate navigation paths of all of the at least two target users includes selecting a first number of target users from the target region to serve as first-type users and regarding a target user in the target region other than the first-type users as a second-type user; determining the passing time length of each available navigation path in a target time window; and selecting an available navigation path from available navigation paths of the first-type users other than an available navigation path requiring the shortest passing time length to serve as a candidate navigation path of the first-type users and selecting an available navigation path requiring the shortest passing time length from available navigation paths of the second-type user to serve as a candidate navigation path of the second-type user to obtain the candidate navigation path group in the target region.

The first number may be determined based on the total number of target users and the first proportion threshold. For example, the product of the total number of target users and the first proportion threshold may be used as the first number. The first proportion threshold may be a fixed value, for example, 30%. Additionally, to save the computing power, the first number may be a fixed value. Therefore, the first proportion threshold may be dynamically determined by the total number of target users and the first number.

With regard to the second-type user, the available navigation path requiring the shortest passing time length may be used as the candidate navigation path, that is, the candidate navigation path of the second-type user is fixed. With regard to the first-type user, an available navigation path may be selected from available navigation paths other than the available navigation path requiring the shortest passing time length to serve as a candidate navigation path, that is, the first-type user may have more than one candidate navigation path. The available navigation path requiring the shortest passing time length is used as the candidate navigation path of the second-type user, and a candidate navigation path is dynamically selected for the first-type user, so that the number of candidate navigation path groups in the target region is reduced. Thereby, the computing power is saved, and the navigation path planning efficiency is improved.

According to the solution of this embodiment of the present disclosure, multiple candidate navigation path groups of the target region are determined, and one candidate navigation path group is selected from the multiple candidate navigation path groups according to the global passing time length of each candidate navigation path group to serve as a recommended navigation path group so that a recommended navigation path of a target user is obtained. In this manner, global optimization of the target region is achieved, and the overall passing efficiency is improved.

Figure 3:
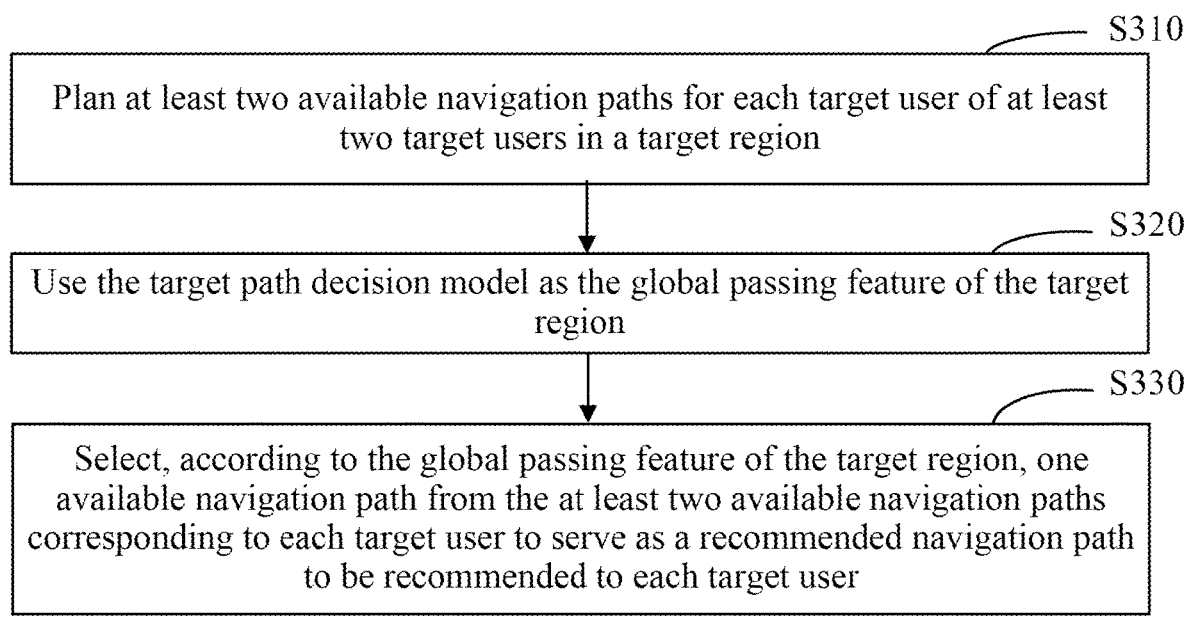
FIG. 3 is a flowchart of another navigation path planning method according to an embodiment of the present disclosure.

FIG. 3 is a flowchart of another navigation path planning method according to an embodiment of the present disclosure. This embodiment is an optional solution provided based on the preceding embodiments. Referring to FIG. 3, the navigation path planning method according to this embodiment includes the steps below.

In S310, at least two available navigation paths are planned for each target user of at least two target users in a target region.

In S320, the target path decision model is used as the global passing feature of the target region.

The target path decision model is determined by the following operations: training at least two alternative path decision models according to multi-agent reinforcement learning; determining the global passing time length of multiple test users in a test region according to each alternative path decision model of the at least two alternative path decision models; and selecting, according to the global passing time length of the test region determined according to each alternative path decision model, an alternative path decision model from the at least two alternative path decision models to serve as a target path decision model.

In S330, one available navigation path is selected according to the global passing feature of the target region from the at least two available navigation paths corresponding to each target user to serve as a recommended navigation path to be recommended to each target user.

The target path decision module may be trained by using the multi-agent algorithm. It is feasible to enable automatic reinforcement learning of a single agent by allocating reward signals by using the interaction between a single target user in the target region and the overall environment including all target users as the research object, using a target user as an agent, and using all the users in the target region as an autonomous system. In this manner, not only the individual interest is optimized, but the general interest of the overall environment is also taken into account. That is, the general interest of the target region is taken into account. The state space and the action space of the multi-agent algorithm are not affected by the number of users. Compared with that when the multi-agent algorithm is used, the state space and the action space of the central control algorithm increase exponentially with the number of users, calculation resources are saved, and the navigation path planning efficiency is improved.

The input of the alternative path decision model may be the global road condition feature of the sample region, the current position information of the sample user, the start point information of the sample user, and the end point information of the sample user. The output of the alternative path decision model may be the recommended navigation path selected for the sample user from the available navigation paths. The reward function of the alternative path decision model may be negatively correlated with the passing time length of the sample user. Based on multi-agent reinforcement learning, at least two alternative path decision models may be trained, where the reward functions of different alternative path decision models are different.

After the training of the alternative path decision model is completed, it is feasible to perform path planning for the test user in the test region based on the alternative path decision model to obtain the global passing time length of the test region; compare the global passing time lengths associated with different alternative path decision models, and select an alternative path decision model from multiple alternative path decision models according to the comparison result to serve as the target path decision model, for example, select the alternative path decision model associated with the shortest global passing time length to serve as the target path decision model. The multi-agent algorithm is not limited in this embodiment of the present disclosure. For example, model parameters may be adjusted by award maximization through constructing a multi-agent Markov decision process.

In an optional embodiment, selecting, according to the global passing feature of the target region, the one available navigation path from the at least two available navigation paths corresponding to each target user to serve as the recommended navigation path to be recommended to each target user includes, by using a global road condition feature of the target region, the current position information of each target user, the start point information of each target user, and the end point information of each target user as input of the target path decision model, obtaining one available navigation path selected by the target path decision model from the at least two available navigation paths corresponding to each target user; and recommending the one available navigation path as the recommended navigation path to each target user.

In this embodiment of the present disclosure, as the global passing feature of the target region, the target path decision model can optimize both the individual interest and the general interest of the target region. With regard to each target user in the target region, the recommended navigation path selected by the target path decision model for each target user is obtained by using the following as the input of the target path decision model: the global road condition feature of the target region, the current position information of each target user, the start point information of each target user, and the end point information of each target user.

The global road condition feature of the target region may include, but is not limited to, road network topology information, road condition information, road information, or environment information. The road condition information is information reflecting the granularity of a road segment, including a congestion level and a historical passing time length at the user level. The road information includes a lane, a geographical position, or intervention information. The lane information may be, for example, the number of lanes or speed limit information. The geographical information may be, for example, longitude and latitude information. The intervention information may be, for example, traffic control information. The environment information refers to information not related to a road, such as weather, a time period, or a holiday.

According to the solution of this embodiment of the present disclosure, all individuals are taken as an autonomous system by using the multi-agent algorithm, and each individual performs learning automatically through allocation of reward signals. In this manner, both the individual interest and the system interest are maximized.

In an optional embodiment, before determining the global passing feature of the target region, the method also includes determining the congestion degree of each available navigation path in the target time window according to the target passing speed of a road segment in the target region in the target time window; and determining, according to the congestion degree of each available navigation path in the target time window, whether to perform the operation of determining the global passing feature.

It is feasible to compare the target passing speed of the road segment in the available navigation path with the congestion condition relationship and determine the congestion degree of the available navigation path in the target time window according to the comparison result. The congestion condition relationship may be predetermined. For example, 0-20 km/h indicates congestion, 20-40 km/h indicates slow passing, and more than 40 km indicates smooth passing.

If the congestion degree of the available navigation path in the target time window satisfies the congestion and lane change condition, the operation of determining the global passing feature is performed, and multi-vehicle cooperative path planning based on the general interest is performed. If the congestion degree of the available navigation path in the target time window does not satisfy the congestion and lane change condition, the operation of determining the global passing feature does not need to be performed, and the available navigation path requiring the shortest passing time length may be used as the recommended navigation path. The congestion and lane change condition may be that the congestion proportion of the available navigation path is greater than a proportion threshold. Navigation path planning is performed based on the general interest when the congestion and lane change condition is satisfied and performed based on the individual interest when the congestion and lane change condition is not satisfied. In this manner, a balance is achieved between the passing efficiency and the calculation resource consumption of path planning. That is, the passing efficiency and the resource consumption are both taken into account.

In an optional embodiment, before determining the congestion degree of each available navigation path in the target time window, the method also includes determining the current passing speed of the road segment in the target region in the current time window; and determining the target passing speed of the road segment in the target time window according to the historical traffic data of the road segment, the environment information of the road segment, the road intervention information of the road segment, and the current passing speed of the road segment in the current time window.

It is feasible to determine the average travelling speed of the road segment in the target region in the current time window according to the global road condition feature of the target region and the current position information of the target user; train a regressor based on the eXtreme Gradient Boosting (XGBoost) algorithm or other regression algorithms; and determine the target passing speed of the road segment in the target time window by use of the regressor and according to the historical traffic data of the road segment, the environment information, the road intervention information, and the current passing speed of the road segment in the current time window. The target passing speed is used for calculation of the passing time length of the road segment and then the global passing time length of the target region. The target passing speed of the road segment in the target time window is determined by using the regression algorithm so that the accuracy of the target passing speed is improved. Thereby, the accuracy of the road segment, reachable navigation path, candidate navigation path, and global passing time length is improved.

Figure 4:
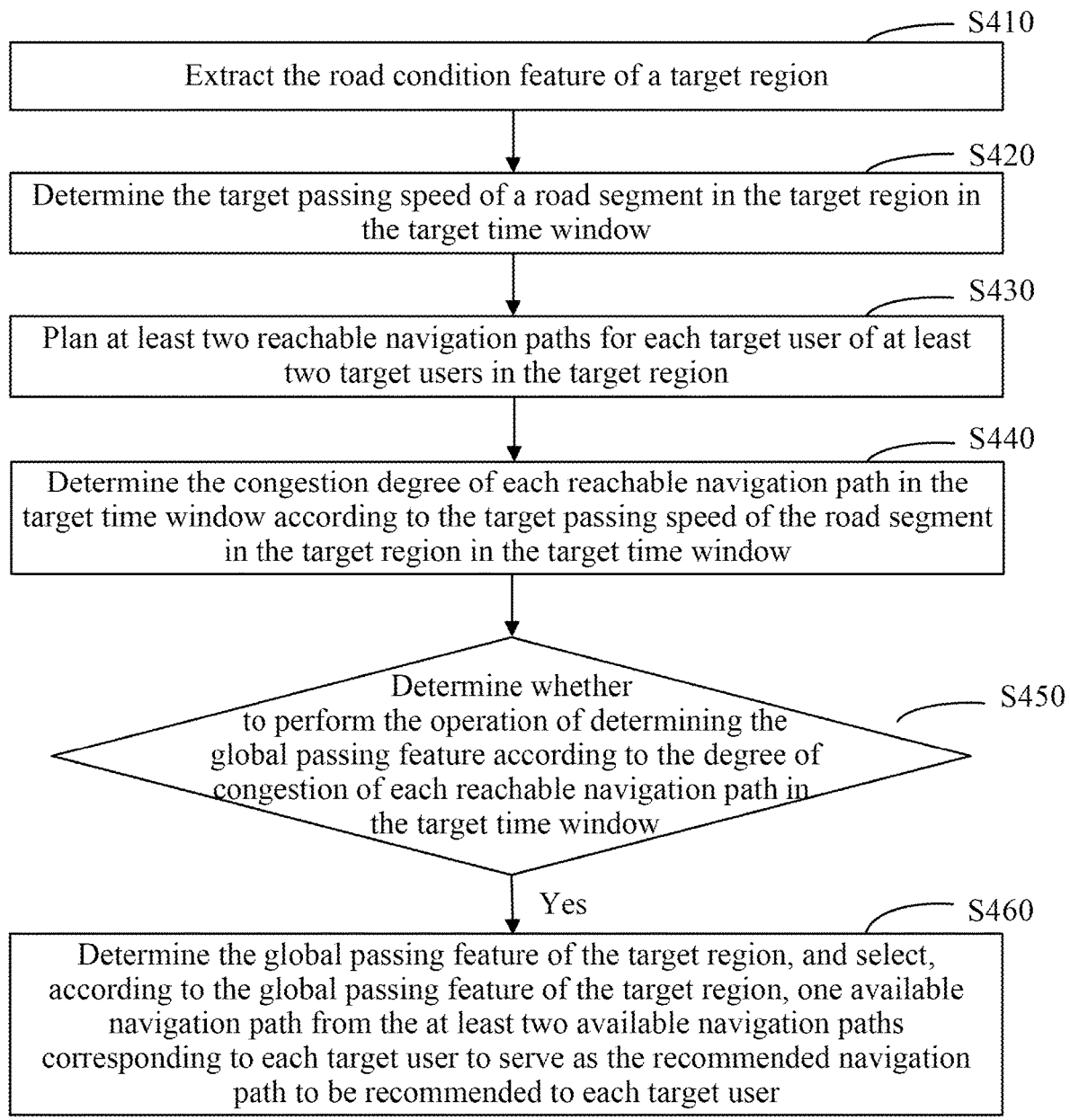
FIG. 4 is a flowchart of another navigation path planning method according to an embodiment of the present disclosure.

FIG. 4 is a flowchart of another navigation path planning method according to an embodiment of the present disclosure. This embodiment is an optional solution provided based on the preceding embodiments. Referring to FIG. 4, the navigation path planning method according to this embodiment includes the steps below.

In S410, the road condition feature of a target region is extracted.

The road condition feature includes, but is not limited to, road network topology, road condition information, road information, or environment information.

In S420, the target passing speed of a road segment in the target region in the target time window is determined.

In S430, at least two reachable navigation paths are planned for each target user of at least two target users in the target region.

In S440, the congestion degree of each reachable navigation path in the target time window is determined according to the target passing speed of the road segment in the target region in the target time window.

In S450, it is determined whether to perform the operation of determining the global passing feature according to the degree of congestion of each reachable navigation path in the target time window; if the operation of determining the global passing feature is performed, the process goes to S460; and if the operation of determining the global passing feature is not performed, the reachable navigation path requiring the shortest passing time length is used, based on the individual interest, as a recommended navigation path.

In S460, the global passing feature of the target region is determined, and one available navigation path is selected according to the global passing feature of the target region from the at least two available navigation paths corresponding to each target user to serve as the recommended navigation path to be recommended to each target user.

The global passing time length of the target region may be determined by using the formula below.

$$G = \min \frac{1}{n} \sum_{i=1}^{n} \frac{L(a_i, r_{selected})}{v(a_i, r_{selected})}$$

G denotes the global passing time length of the target region. n denotes the number of users in the target region. $L(a_i, r_{selected})$ denotes the length of the candidate navigation path selected by the user $a_i$. $v(a_i, r_{selected})$ denotes the speed of the road segment in the candidate navigation path selected by the user $a_i$. After the global passing time length is minimized, the overall passing time length of multiple users in the target region is reduced.

The recommended navigation path may be selected based on optimization of the general interest by using the central control algorithm or the multi-agent algorithm so that a balance is fully achieved between the individual interest and the general interest. Through the path selection balance between different users, the real individual average optimization can be achieved with the overall optimization as the goal. The central control algorithm introduces a central controller to the target region and integrally selects, through the central controller, a recommended navigation path for each user in the target region according to the global road condition feature of the target region. The multi-agent algorithm selects a recommended navigation path for a single user by using the interaction between the single target user in the target region and the overall environment as the research object. Compared with the central control algorithm, the multi-agent algorithm saves calculation resources by reducing the decision space and the state space.

The multi-agent algorithm uses all individuals (that is, all users) as an autonomous system to enable automatic reinforcement learning of each individual by allocating reward signals. In this manner, both the individual interest and the general interest are optimized. A multi-agent Markov decision process is constructed by regarding each user in the target region as an agent and the user set in the target region as a multi-agent set. The value function, that is, the desired cumulative reward, of each agent is optimized by the multi-agent algorithm.

$$v_i^{(\pi_i, \pi_{-i})}(s) = E[\Sigma_t^T \gamma_i^t R_i(s_t, u_{i,t}, u_{-i,t}) | u_t \sim \pi(\cdot | s_t), s_{t+1} \sim P(\cdot | s_t, u_t), s_0 = s)]; \quad (1)$$

v denotes a cumulative reward. E denotes an expectation operator. γ denotes a reward attenuation factor. P denotes a state transition function. R denotes a reward function. The subscript i denotes the ith agent. The subscript −i denotes an agent other than the ith agent. π denotes the strategy of each agent. s denotes the state of the current agent. u denotes the current action. T denotes the total time step. t denotes the current time.

In a multi-agent reinforcement learning process, each agent obtains its best response strategy by maximizing its cumulative reward.

$$\pi^{*i} = \mathrm{argmax}_{\pi^i \in \Pi} v_i^{(\pi^i, \pi^{-i})} \quad (2)$$

$\pi^{*i}$ denotes the best strategy of the ith agent.

After the reinforcement learning is completed, that is, after the value network model (that is, the alternative path decision model) is obtained by being trained successfully using the multi-agent algorithm, the multiple agents reach a Markov Nash equilibrium, that is, no agent can deviate unilaterally from its strategy to increase its reward allocation.

$$v_i^{(\pi_i, \pi_{-i})}(s) \geq v_i^{(\pi'_i, \pi_{-i})}(s), \forall \pi^{i} \in \Pi, \forall \pi^{-i} \in \pi^{-i}, \forall s \in S, \forall i \in N \quad (3)$$

$\pi^{ri}$ denotes a response strategy other than $\pi^s$. Π denotes a strategy set of the multiple agents. S denotes a state set of the multiple agents. N denotes an index set of the multiple agents.

The alternative path decision model obtained through multi-agent reinforcement learning is configured to select a recommended navigation path for a user in a to-be-processed region. The input of the alternative path decision model may be the global road condition feature of the to-be-processed region, the current position information of the user in the to-be-processed region, the start point information of the user in the to-be-processed region, and the end point information of the user in the to-be-processed region. The output of the alternative path decision model may be the recommended navigation path of the user.

Based on the preceding multi-agent reinforcement learning, at least two alternative path decision models may be obtained by being trained. With regard to each alternative path decision model, a recommended navigation path may be selected for each test user in the test region, and the global passing time length of the test region associated with the alternative path decision model may be obtained according to the recommended navigation path of each test user. One alternative path decision model may be selected from the at least two alternative path decision models according to the global passing time length of the test region associated with each alternative path decision model to serve as the target path decision model. For example, the alternative path decision model requiring the shortest global passing time length may be used as the target path decision model. The target path decision model is obtained by being trained through multi-agent reinforcement learning. In the non-cooperative game of the multiple users, reward functions of the agents are reasonably allocated, and expected cumulative rewards of the multiple agents are repeatedly maximized. In this manner, both the personal interest and the overall interest are optimized. Moreover, the target path decision model is obtained by being selected according to the global passing time length of the test region. In this manner, the overall commuting efficiency in the target region is improved.

In the path planning process, the global passing feature of the target region, the current position information of each target user, the start point information of each target user, and the end point information of each target user may be input to the target path decision model so that the recommended navigation path of each target user is obtained.

Compared with a single-user navigation scheme, the navigation planning scheme, in the embodiment of the present disclosure, which is based on the overall passing time length, that is, the general interest, of multiple users in the target region, can provide a reasonable path for each user in the target region to pass through with a higher global commuting efficiency, thereby improving the overall commuting efficiency in the target region.

Figure 5:
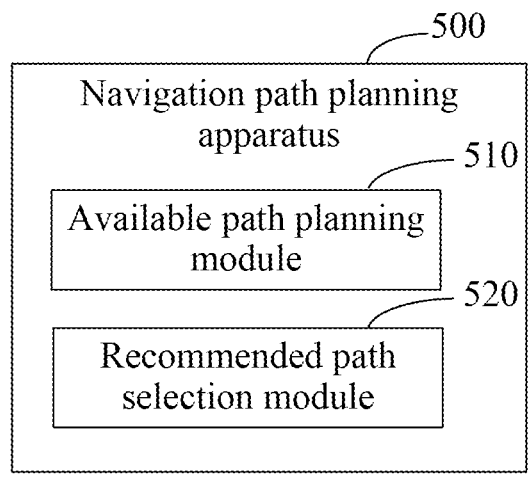
FIG. 5 is a diagram of a navigation path planning apparatus according to an embodiment of the present disclosure.

FIG. 5 is a diagram of a navigation path planning apparatus according to an embodiment of the present disclosure. This embodiment is applicable to the case where a recommended path is provided for a user based on an electronic map. The apparatus is configured in an electronic device. The electronic device may be a scanning pen. The electronic device can perform the navigation path planning method according to any embodiment of the present disclosure. Referring to FIG. 5, the navigation path planning apparatus 500 includes an available path planning module 510 and a recommended path selection module 520.

The available path planning module 510 is configured to plan at least two available navigation paths for each target user of at least two target users in a target region. The recommended path selection module 520 is configured to determine, according to the global passing feature of the target region, a global passing feature of the target region and select one available navigation path from the at least two available navigation paths corresponding to each target user to serve as a recommended navigation path to be recommended to each target user.

Figure 6:
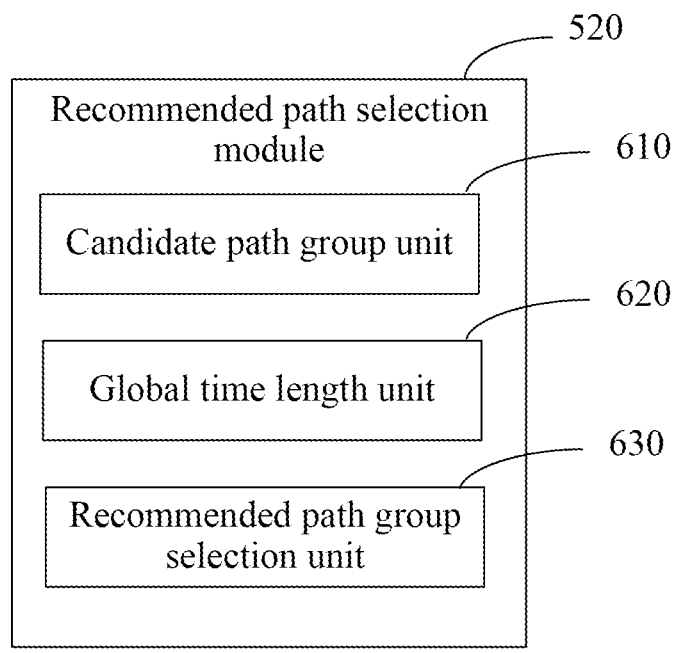
FIG. 6 is a diagram of a recommended path selection module according to an embodiment of the present disclosure.

In an optional embodiment, as shown in FIG. 6, the recommended path selection module 520 includes a candidate path group unit 610, a global time length unit 620, and a recommended path group selection unit 630.

The candidate path group unit 610 is configured to select one available navigation path from the at least two available navigation paths corresponding to each target user to serve as a candidate navigation path of each target user to obtain a candidate navigation path group comprising candidate navigation paths of all of the at least two target users; and repeat the operation of selecting one available navigation path from the at least two available navigation paths corresponding to each target user to serve as a candidate navigation path of each target user to obtain a candidate navigation path group comprising candidate navigation paths of all of the at least two target users to obtain a plurality of candidate navigation path groups of the target region. The global time length unit 620 is configured to determine the global passing time length of each candidate navigation path group of the plurality of candidate navigation path groups of the target region according to each candidate navigation path group of the target region. The recommended path group selection unit 630 is configured to select one candidate navigation path group from the plurality of candidate navigation path groups according to the global passing time length of each candidate navigation path group to serve as a recommended navigation path group and obtain the recommended navigation path of each target user according to the recommended navigation path group.

Figure 7:
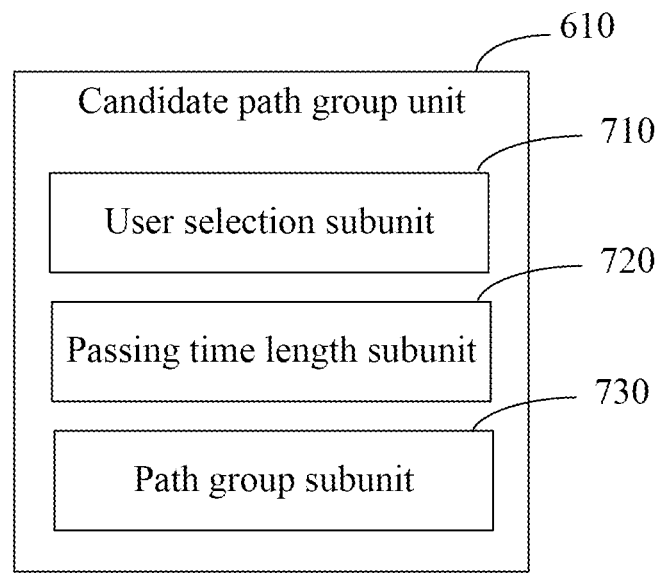
FIG. 7 is a diagram of a candidate path group unit according to an embodiment of the present disclosure.

In an optional embodiment, as shown in FIG. 7, the candidate path group unit 610 includes a user selection subunit 710, a passing time length subunit 720, and a path group subunit 730.

The user selection subunit 710 is configured to select a first number of target users from the target region to serve as first-type users and regard a target user in the target region other than the first-type users as a second-type user, wherein the first number is determined according to a total number of the at least two target users and a first proportion threshold. The passing time length subunit 720 is configured to determine a passing time length of each available navigation path in a target time window. The path group subunit 730 is configured to select an available navigation path from available navigation paths of the first-type users other than an available navigation path requiring the shortest global passing time length to serve as a candidate navigation path of the first-type users and select an available navigation path requiring the shortest global passing time length from available navigation paths of the second-type user to serve as a candidate navigation path of the second-type user to obtain the candidate navigation path group.

Figure 8:
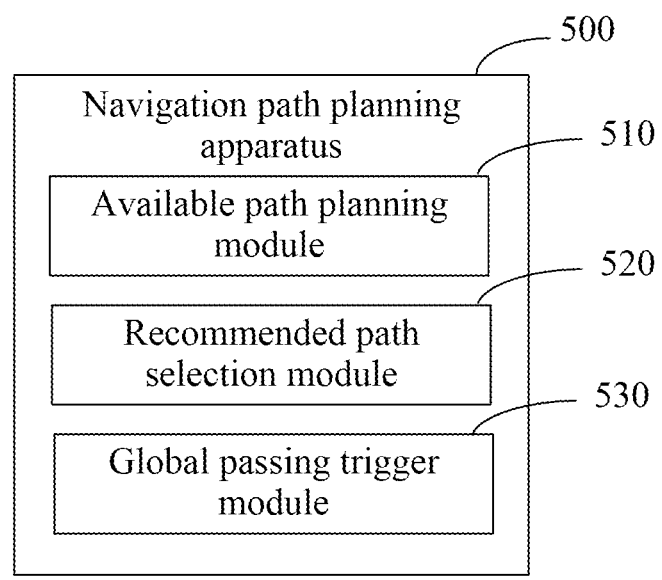
FIG. 8 is a diagram of another navigation path planning apparatus according to an embodiment of the present disclosure.
Figure 9:
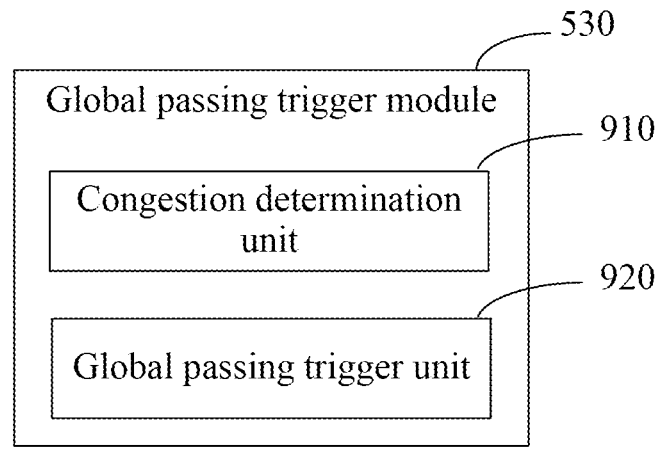
FIG. 9 is a diagram of a global passing trigger module according to an embodiment of the present disclosure.

In an optional embodiment, as shown in FIGS. 8 and 9, the navigation path planning apparatus 500 also includes a global passing trigger module 530. The global passing trigger module 530 includes a congestion determination unit 910 and a global passing trigger unit 920.

The congestion determination unit 910 is configured to determine a congestion degree of each available navigation path in the target time window according to a target passing speed of a road segment in the target region in the target time window. The global passing trigger unit 920 is configured to determine, according to the congestion degree of each available navigation path in the target time window, whether to perform the operation of determining the global passing feature.

Figure 10:
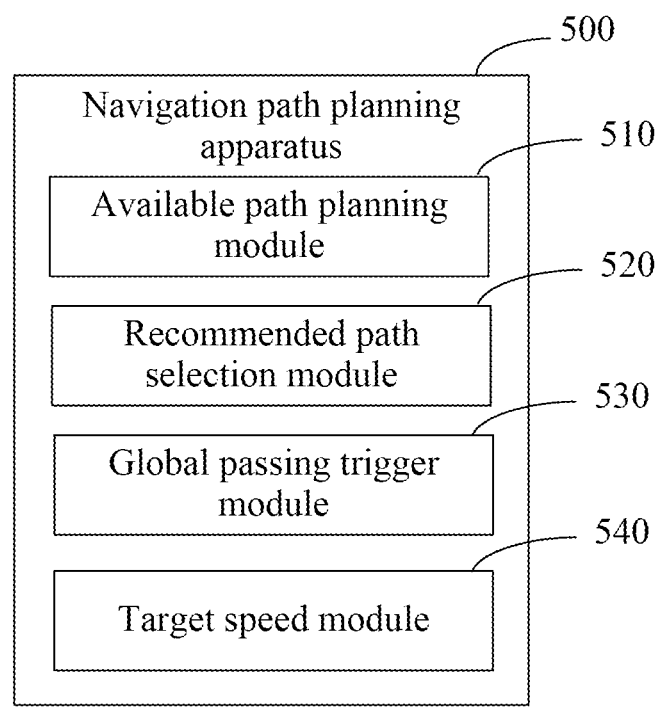
FIG. 10 is a diagram of another navigation path planning apparatus according to an embodiment of the present disclosure.
Figure 11:
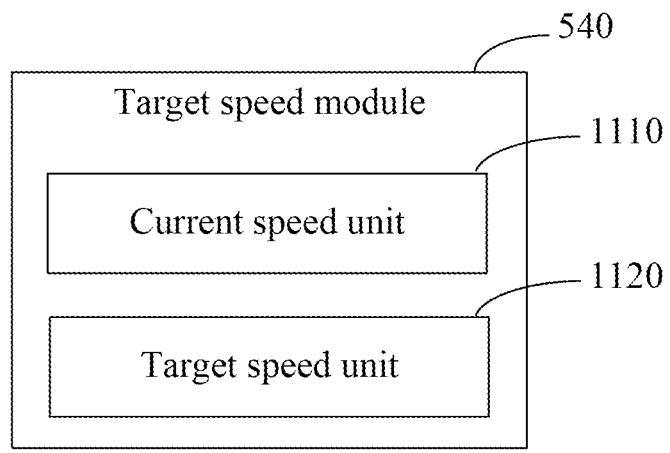
FIG. 11 is a diagram of a target speed module according to an embodiment of the present disclosure.

In an optional embodiment, as shown in FIGS. 10 and 11, the navigation path planning apparatus 500 also includes a target speed module 540. The target speed module 540 includes a current speed unit 1110 and a target speed unit 1120.

The current speed unit 1110 is configured to determine a current passing speed of the road segment in the target region in a current time window. The target speed unit 1120 is configured to determine the target passing speed of the road segment in the target time window according to the historical traffic data of the road segment, the environment information of the road segment, the road intervention information of the road segment, and the current passing speed of the road segment in the current time window.

Figure 12:
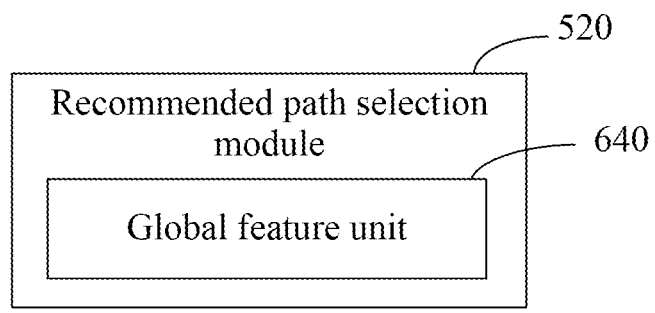
FIG. 12 is a diagram of another recommended path selection module according to an embodiment of the present disclosure.

In an optional embodiment, as shown in FIG. 12, the recommended path selection module 520 includes a global feature unit 640.

The global feature unit 640 is configured to train at least two alternative path decision models according to multi-agent reinforcement learning; determine the global passing time length of a plurality of test users in a test region according to each alternative path decision model of the at least two alternative path decision models; select, according to the global passing time length of the test region determined according to each alternative path decision model, an alternative path decision model from the at least two alternative path decision models to serve as a target path decision model; and use the target path decision model as the global passing feature of the target region.

Figure 13:
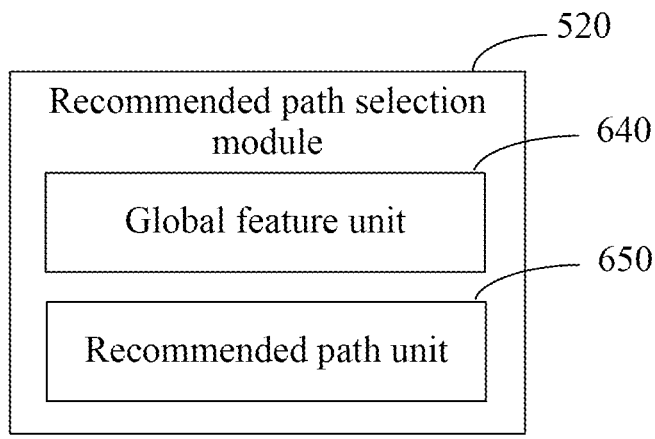
FIG. 13 is a diagram of another recommended path selection module according to an embodiment of the present disclosure.

In an optional embodiment, as shown in FIG. 13, the recommended path selection module 520 also includes a recommended path unit 650 configured to, by using a global road condition feature of the target region, the current position information of each target user, the start point information of each target user, and the end point information of each target user as input of the target path decision model, obtain one available navigation path selected by the target path decision model from the at least two available navigation paths corresponding to each target user; and recommend the one available navigation path as the recommended navigation path to each target user.

According to the solution of this embodiment, in view of the limitation in selection of the best path navigation, the navigation planning scheme based on the overall passing time length, that is, the general interest, of multiple users in the target region can provide a reasonable path for each user in the target region to pass through with a higher global commuting efficiency, thereby improving the overall commuting efficiency in the target region.

In the technical solutions of the present disclosure, the collection, storage, use, processing, transmission, provision, and disclosure of user personal information involved are in compliance with provisions of relevant laws and regulations and do not violate public order and good customs.

According to an embodiment of the present disclosure, the present disclosure also provides an electronic device, a readable storage medium and a computer program product.

Figure 14:
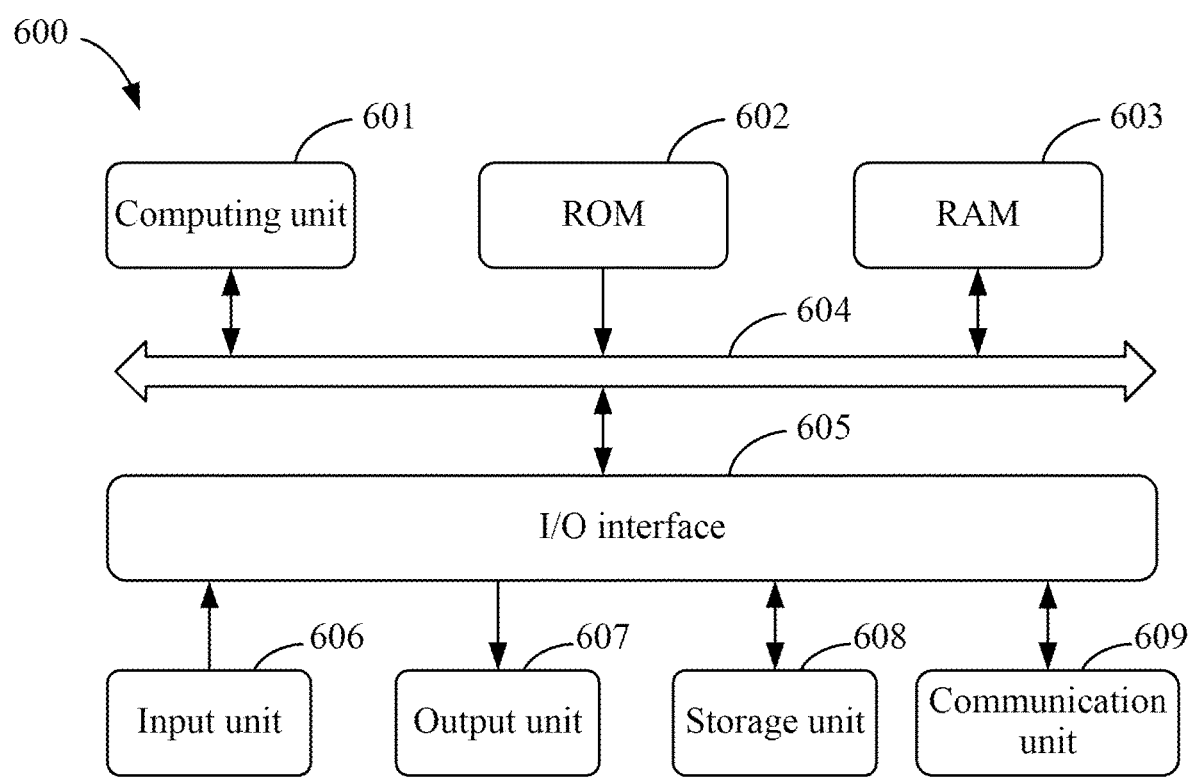
FIG. 14 is a block diagram of an electronic device for performing the navigation path planning method according to any embodiment of the present disclosure.

FIG. 14 is a block diagram of an example electronic device 600 for implementing any embodiment of the present disclosure. Electronic devices 600 are intended to represent various forms of digital computers, for example, laptop computers, desktop computers, worktables, personal digital assistants, servers, blade servers, mainframe computers and other applicable computers. Electronic devices 600 may also represent various forms of mobile devices, for example, personal digital assistants, cellphones, smartphones, wearable devices and other similar computing apparatus. Herein the shown components, the connections and relationships between these components, and the functions of these components are illustrative only and are not intended to limit the implementation of the present disclosure as described and/or claimed herein.

As shown in FIG. 14, the electronic device 600 includes a computing unit 601. The computing unit 601 may perform various types of appropriate operations and processing based on a computer program stored in a read-only memory (ROM) 602 or a computer program loaded from a storage unit 608 to a random-access memory (RAM) 603. The RAM 603 may also store various programs and data required for the operation of the electronic device 600. The computing unit 601, the ROM 602 and the RAM 603 are connected to each other through a bus 604. An input/output (I/O) interface 605 is also connected to the bus 604.

Multiple components in the electronic device 600 are connected to the I/O interface 605. The multiple components include an input unit 606 such as a keyboard or a mouse, an output unit 607 such as various types of displays or speakers, the storage unit 608 such as a magnetic disk or an optical disk, and a communication unit 609 such as a network card, a modem or a wireless communication transceiver. The communication unit 609 allows the electronic device 600 to exchange information/data with other devices over a computer network such as the Internet and/or various telecommunications networks.

The computing unit 601 may be a general-purpose and/or special-purpose processing component having multiple processing and computing capabilities. Some examples of the computing unit 601 include, but are not limited to, central processing units (CPUs), graphics processing units (GPUs), various dedicated artificial intelligence (AI) computing chips, various computing units running machine learning models and algorithms, digital signal processors (DSPs) and any suitable processors, controllers and microcontrollers. The computing unit 601 performs various methods and processing described above, such as the navigation path planning method. For example, in some embodiments, the navigation path planning method may be implemented as a computer software program tangibly contained in a machine-readable medium such as the storage unit 608. In some embodiments, part or all of computer programs may be loaded and/or installed onto the electronic device 600 via the ROM 602 and/or the communication unit 609. When the computer programs are loaded to the RAM 603 and executed by the computing unit 601, one or more steps of the navigation path planning method may be performed. Alternatively, in other embodiments, the computing unit 601 may be configured, in any other suitable manner (for example, by means of firmware), to perform the navigation path planning method.

The various embodiments of the systems and techniques described herein may be implemented in digital electronic circuitry, integrated circuitry, a field-programmable gate array (FPGA), an application-specific integrated circuit (ASIC), application specific standard parts (ASSP), a system on a chip (SoC), a complex programmable logic device (CPLD), computer hardware, firmware, software and/or a combination thereof. The various embodiments may include implementations in one or more computer programs. The one or more computer programs are executable and/or interpretable on a programmable system including at least one programmable processor. The programmable processor may be a special-purpose or general-purpose programmable processor for receiving data and instructions from a memory system, at least one input device and at least one output device and transmitting data and instructions to the memory system, the at least one input device and the at least one output device.

Program codes for implementation of the methods of the present disclosure may be written in one programming language or any combination of multiple programming languages. These program codes may be provided for the processor or controller of a general-purpose computer, a special-purpose computer or another programmable data processing device to enable functions/operations specified in a flowchart and/or a block diagram to be implemented when the program codes are executed by the processor or controller. The program codes may be executed entirely on a machine, partly on a machine, as a stand-alone software package, partly on a machine and partly on a remote machine, or entirely on a remote machine or a server.

In the context of the present disclosure, the machine-readable medium may be a tangible medium that may include or store a program that is used by or in conjunction with a system, apparatus or device that executes instructions. The machine-readable medium may be a machine-readable signal medium or a machine-readable storage medium. The machine-readable medium may include, but is not limited to, an electronic, magnetic, optical, electromagnetic, infrared, or semiconductor system, apparatus or device or any appropriate combination thereof. Examples of the machine-readable storage medium may include an electrical connection based on one or more wires, a portable computer disk, a hard disk, a random-access memory (RAM), a read-only memory (ROM), an erasable programmable read-only memory (EPROM), a flash memory, an optical fiber, a portable compact disk read-only memory (CD-ROM), an optical memory device, a magnetic memory device or any suitable combination thereof.

In order that interaction with a user is provided, the systems and techniques described herein may be implemented on a computer. The computer has a display apparatus for displaying information to the user, such as a cathode-ray tube (CRT) or a liquid-crystal display (LCD) monitor, and a keyboard and a pointing apparatus such as a mouse or a trackball through which the user can provide input to the computer. Other types of devices may also be used for providing interaction with a user. For example, feedback provided for the user may be sensory feedback in any form (for example, visual feedback, auditory feedback or haptic feedback). Moreover, input from the user may be received in any form (including acoustic input, voice input or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein), or a computing system including any combination of such back-end, middleware or front-end components. Components of a system may be interconnected by any form or medium of digital data communication (for example, a communication network). Examples of the communication network include a local area network (LAN), a wide area network (WAN), a blockchain network and the Internet.

The computing system may include clients and servers. The clients and the servers are usually far away from each other and generally interact through the communication network. The relationship between the client and the server arises by virtue of computer programs running on respective computers and having a client-server relationship to each other. The server may be a cloud server, also referred to as a cloud computing server or a cloud host. As a host product in a cloud computing service system, the server solves the defects of difficult management and weak service scalability in conventional physical host and virtual private server (VPS) services. The server may also be a server of a distributed system, or a server combined with a blockchain.

Various forms of the preceding flows may be used, with steps reordered, added, or removed. For example, the steps described in the present disclosure may be executed in parallel, in sequence or in a different order as long as the desired result of the technical solutions disclosed in the present disclosure is achieved. The execution sequence of these steps is not limited herein.

What is claimed is:

1. A navigation path planning method, performed by a navigation path planning apparatus, comprising:
    planning at least two available navigation paths for each target user of at least two target users in a target region by using a path planning algorithm; and
    determining a global passing feature of the target region and selecting, according to the global passing feature of the target region, one available navigation path from the at least two available navigation paths corresponding to the each target user to serve as a recommended navigation path to be recommended to the each target user, wherein the global passing feature of the target region refers to a global passing feature of the at least two target users in the target region and is used for cooperative path planning that takes into account a global passing time length in the target region;
    wherein determining the global passing feature of the target region and selecting, according to the global passing feature of the target region, the one available navigation path from the at least two available navigation paths corresponding to the each target user to serve as the recommended navigation path to be recommended to the each target user comprise:

selecting one available navigation path from the at least two available navigation paths corresponding to the each target user to serve as a candidate navigation path of the each target user to obtain a candidate navigation path group comprising candidate navigation paths of all of the at least two target users; and repeating the operation of selecting one available navigation path from the at least two available navigation paths corresponding to the each target user to serve as a candidate navigation path of the each target user to obtain a candidate navigation path group comprising candidate navigation paths of all of the at least two target users to obtain a plurality of candidate navigation path groups of the target region;

determining, according to each candidate navigation path group of the plurality of candidate navigation path groups of the target region, a global passing time length of the each candidate navigation path group; and selecting, according to the global passing time length of the each candidate navigation path group, one candidate navigation path group from the plurality of candidate navigation path groups to serve as a recommended navigation path group and obtaining the recommended navigation path of the each target user according to the recommended navigation path group.

2. The method of claim 1, wherein selecting the one available navigation path from the at least two available navigation paths corresponding to the each target user to serve as the candidate navigation path of the each target user to obtain the candidate navigation path group comprising the candidate navigation paths of all of the at least two target users comprises:

selecting a first number of target users from the target region to serve as first-type users and regarding a target user in the target region other than the first-type users as a second-type user, wherein the first number is determined according to a total number of the at least two target users and a first proportion threshold;

determining a passing time length of each available navigation path of the at least two available navigation paths corresponding to the each target user in a target time window; and selecting an available navigation path from available navigation paths of the first-type users other than an available navigation path requiring a shortest passing time length to serve as a candidate navigation path of the first-type users and selecting an available navigation path requiring a shortest passing time length from available navigation paths of the second-type user to serve as a candidate navigation path of the second-type user to obtain the candidate navigation path group.

3. The method of claim 1, before determining the global passing feature of the target region, the method further comprising:

determining a congestion degree of each available navigation path of the at least two available navigation paths corresponding to the each target user in a target time window according to a target passing speed of a road segment in the target region in the target time window; and determining, according to the congestion degree of the each available navigation path in the target time window, whether to perform the operation of determining the global passing feature.

4. The method of claim 3, before determining the congestion degree of the each available navigation path in the target time window, the method further comprising:

determining a current passing speed of the road segment in the target region in a current time window; and determining the target passing speed of the road segment in the target time window according to historical traffic data of the road segment, environment information of the road segment, road intervention information of the road segment, and the current passing speed of the road segment in the current time window.

5. The method of claim 1, wherein determining the global passing feature of the target region comprises:

training at least two alternative path decision models according to multi-agent reinforcement learning;

determining a global passing time length of a plurality of test users in a test region according to each alternative path decision model of the at least two alternative path decision models;

selecting, according to the global passing time length of the test region determined according to the each alternative path decision model, an alternative path decision model from the at least two alternative path decision models to serve as a target path decision model; and using the target path decision model as the global passing feature of the target region.

6. The method of claim 5, wherein selecting, according to the global passing feature of the target region, the one available navigation path from the at least two available navigation paths corresponding to the each target user to serve as the recommended navigation path to be recommended to the each target user comprises:

by using a global road condition feature of the target region, current position information of the each target user, start point information of the each target user, and end point information of the each target user as input of the target path decision model, obtaining one available navigation path selected by the target path decision model from the at least two available navigation paths corresponding to the each target user; and recommending the one available navigation path as the recommended navigation path to the each target user.

7. A navigation path planning apparatus, comprising: at least one processor and a memory communicatively connected to the at least one processor, wherein the memory stores instructions executable by the at least one processor to enable the at least one processor to perform steps in the following modules:

an available path planning module configured to plan at least two available navigation paths for each target user of at least two target users in a target region by using a path planning algorithm; and a recommended path selection module configured to determine a global passing feature of the target region and select, according to the global passing feature of the target region, one available navigation path from the at least two available navigation paths corresponding to the each target user to serve as a recommended navigation path to be recommended to the each target user, wherein the global passing feature of the target region refers to a global passing feature of the at least two target users in the target region and is used for cooperative path planning that takes into account a global passing time length in the target region;

wherein the recommended path selection module comprises:

a candidate path group unit configured to select one available navigation path from the at least two available navigation paths corresponding to the each target user to serve as a candidate navigation path of the each target user to obtain a candidate navigation path group comprising candidate navigation paths of all of the at least two target users; and repeat the operation of selecting one available navigation path from the at least two available navigation paths corresponding to the each target user to serve as a candidate navigation path of the each target user to obtain a candidate navigation path group comprising candidate navigation paths of all of the at least two target users to obtain a plurality of candidate navigation path groups of the target region;

a global time length unit configured to determine, according to each candidate navigation path group of the plurality of candidate navigation path groups of the target region, a global passing time length of the each candidate navigation path group; and a recommended path group selection unit configured to select, according to the global passing time length of the each candidate navigation path group, one candidate navigation path group from the plurality of candidate navigation path groups to serve as a recommended navigation path group and obtain the recommended navigation path of the each target user according to the recommended navigation path group.

8. The apparatus of claim 7, wherein the candidate path group unit comprises:

a user selection subunit configured to select a first number of target users from the target region to serve as first-type users and regard a target user in the target region other than the first-type users as a second-type user, wherein the first number is determined according to a total number of the at least two target users and a first proportion threshold;

a passing time length subunit configured to determine a passing time length of each available navigation path in a target time window; and a path group subunit configured to select an available navigation path from available navigation paths of the first-type users other than an available navigation path requiring a shortest passing time length to serve as a candidate navigation path of the first-type users and select an available navigation path requiring a shortest passing time length from available navigation paths of the second-type user to serve as a candidate navigation path of the second-type user to obtain the candidate navigation path group.

9. The apparatus of claim 7, further comprising a global passing trigger module, wherein the global passing trigger module comprises:

a congestion determination unit configured to determine a congestion degree of each available navigation path of the at least two available navigation paths corresponding to the each target user in a target time window according to a target passing speed of a road segment in the target region in the target time window; and a global passing trigger unit configured to determine, according to the congestion degree of the each available navigation path in the target time window, whether to perform the operation of determining the global passing feature.

10. The apparatus of claim 9, further comprising a target speed module, wherein the target speed module comprises:

a current speed unit configured to determine a current passing speed of the road segment in the target region in a current time window; and a target speed unit configured to determine the target passing speed of the road segment in the target time window according to historical traffic data of the road segment, environment information of the road segment, road intervention information of the road segment, and the current passing speed of the road segment in the current time window.

11. The apparatus of claim 7, wherein the recommended path selection module comprises a global feature unit, wherein the global feature unit is configured to:

train at least two alternative path decision models according to multi-agent reinforcement learning;

determine a global passing time length of a plurality of test users in a test region according to each alternative path decision model of the at least two alternative path decision models;

select, according to the global passing time length of the test region determined according to the each alternative path decision model, an alternative path decision model from the at least two alternative path decision models to serve as a target path decision model; and use the target path decision model as the global passing feature of the target region.

12. The apparatus of claim 11, wherein the recommended path selection module further comprises:

a recommended path unit configured to, by using a global road condition feature of the target region, current position information of the each target user, start point information of the each target user, and end point information of the each target user as input of the target path decision model, obtain one available navigation path selected by the target path decision model from the at least two available navigation paths corresponding to the each target user; and recommend the one available navigation path as the recommended navigation path to the each target user.

13. A non-transitory computer-readable storage medium storing computer instructions, which when executed by a processor, causes the processor to perform the following steps:

planning at least two available navigation paths for each target user of at least two target users in a target region by using a path planning algorithm; and determining a global passing feature of the target region and selecting, according to the global passing feature of the target region, one available navigation path from the at least two available navigation paths corresponding to the each target user to serve as a recommended navigation path to be recommended to the each target user, wherein the global passing feature of the target region refers to a global passing feature of the at least two target users in the target region and is used for cooperative path planning that takes into account a global passing time length in the target region;

wherein determining the global passing feature of the target region and selecting, according to the global passing feature of the target region, the one available navigation path from the at least two available navigation paths corresponding to the each target user to serve as the recommended navigation path to be recommended to the each target user comprise:

selecting one available navigation path from the at least two available navigation paths corresponding to the each target user to serve as a candidate navigation path of the each target user to obtain a candidate navigation path group comprising candidate navigation paths of all of the at least two target users; and repeating the operation of selecting one available navigation path from the at least two available navigation paths corresponding to the each target user to serve as a candidate navigation path of the each target user to obtain a candidate navigation path group comprising candidate navigation paths of all of the at least two target users to obtain a plurality of candidate navigation path groups of the target region;

determining, according to each candidate navigation path group of the plurality of candidate navigation path groups of the target region, a global passing time length of the each candidate navigation path group; and selecting, according to the global passing time length of the each candidate navigation path group, one candidate navigation path group from the plurality of candidate navigation path groups to serve as a recommended navigation path group and obtaining the recommended navigation path of the each target user according to the recommended navigation path group.

* * * * *